Sept. 17, 1968   I. L. NELSON ET AL   3,401,609
PACKAGE FORMING APPARATUS
Filed Nov. 14, 1966   5 Sheets-Sheet 4
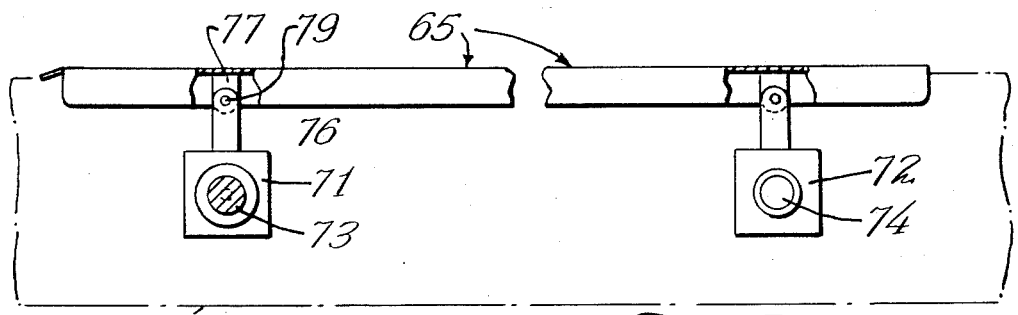
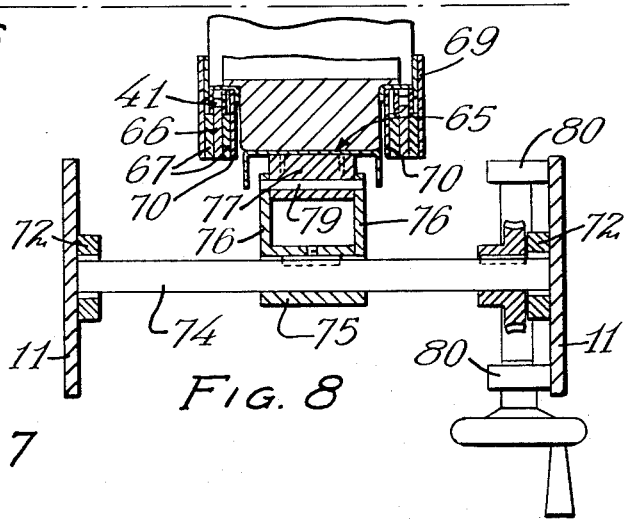
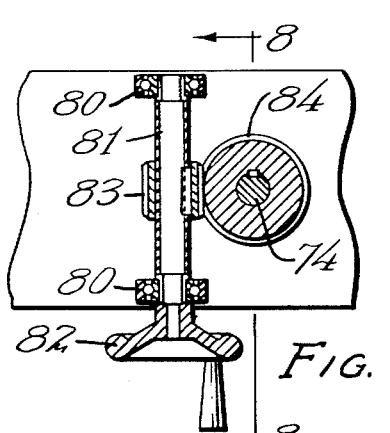
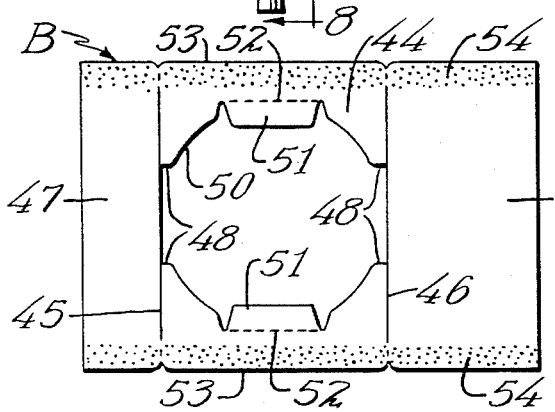
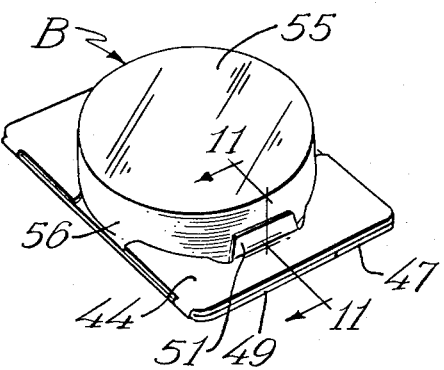
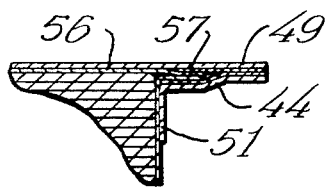
INVENTOR
IVER L. NELSON
HAROLD V. DETTMAN
BY
ATTORNEY INVENTOR
IVER L. NELSON
HAROLD V. DETTMAN
BY Robert M. Dunning
ATTORNEY

United States Patent Office 3,401,609
Patented Sept. 17, 1968

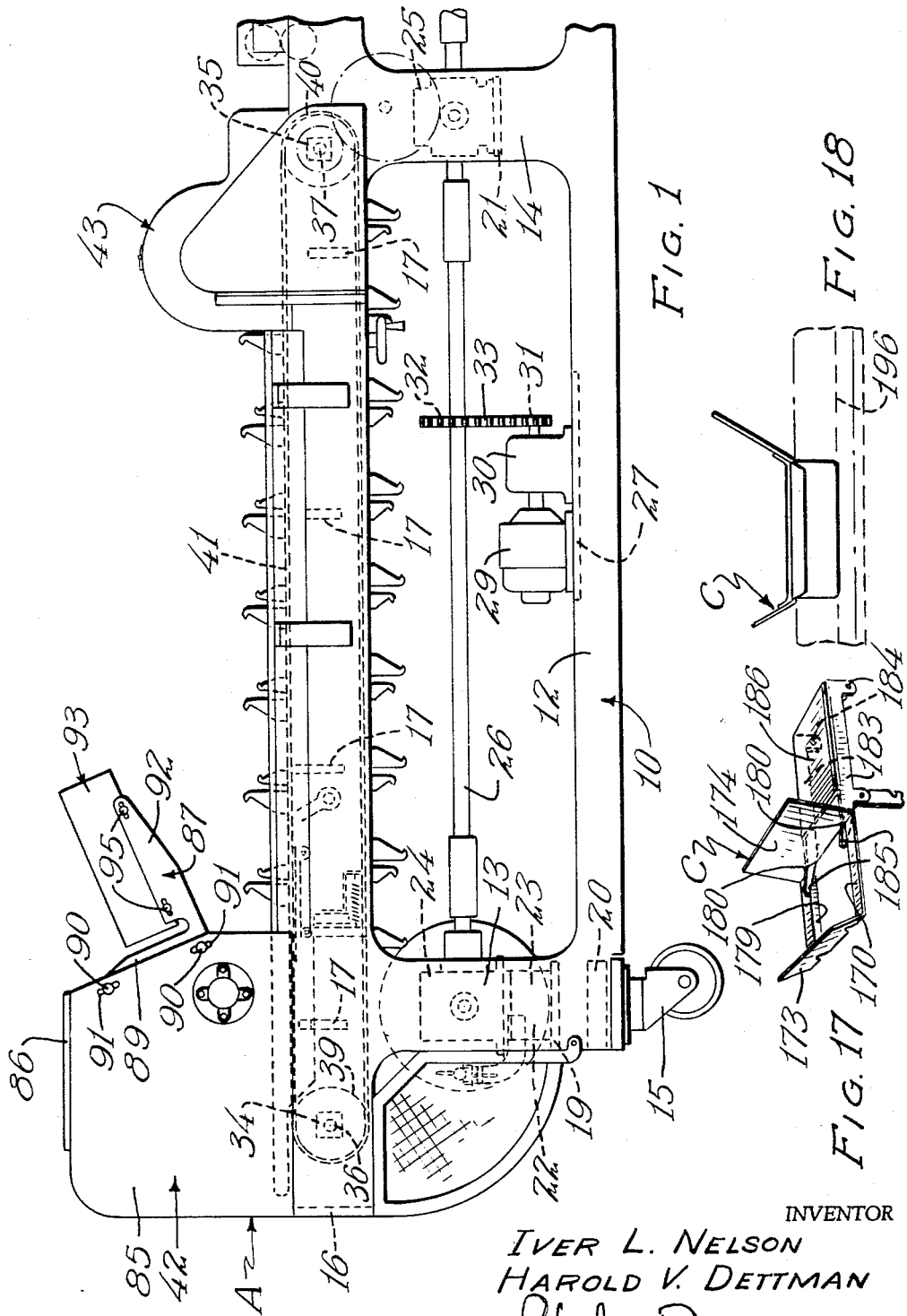

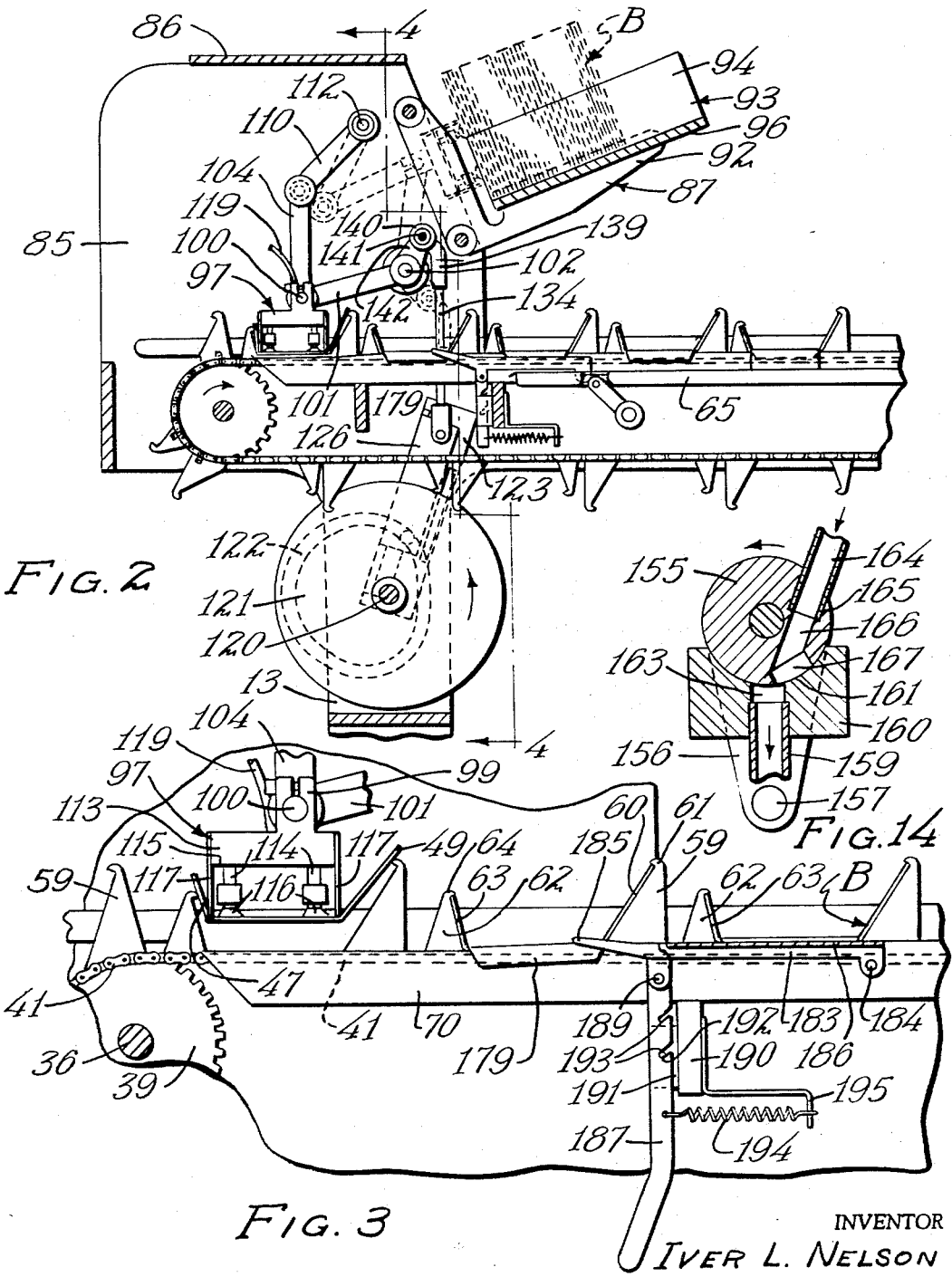

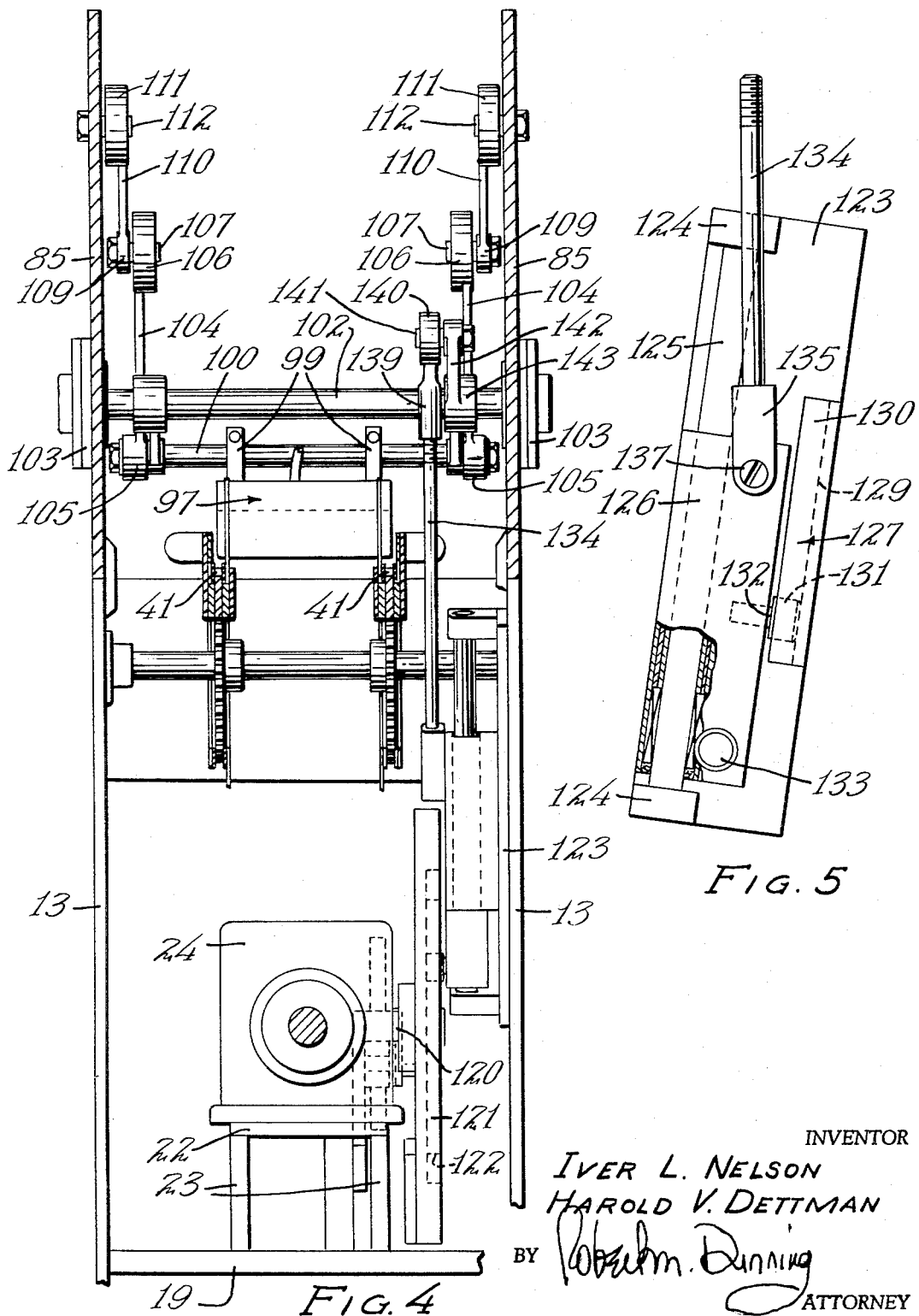

3,401,609
PACKAGE FORMING APPARATUS
Iver L. Nelson, and Harold V. Dettman, Minneapolis, Minn., assignors to Hoerner Waldorf Corporation, Ramsey, Minn., a corporation of Delaware
Filed Nov. 14, 1966, Ser. No. 594,106
9 Claims. (Cl. 93—49)

This invention relates to an improvement in package forming apparatus and deals particularly with a machine for attaching a pouch containing a block of product enclosed within a pouch in a paperboard folder.

Various materials, such as sliced meat as an example, are often packaged in sealed plastic pouches in order to protect them from deterioration due to contact with the atmosphere. These pouches are larger in at least one dimension than the product contained, and the ends of the pouches are usually flattened on a plane substantially flush with one end of the block of material. These flattened ends of the pouches are usually wrinkled and rather untidy due to the excess of the plastic which must be sealed together. In other words, the plastic pouch must be of large enough dimensions to accommodate the block of material, resulting in gathers and wrinkles when the ends of the pouch are flattened. In order to conceal these rather unsightly pouch ends, and to provide means of advertising the product and describing the nature of the contents, a paperboard folder is usually provided designed to enclose the pouch ends and to provide a display area on each side of the pouch. The folder also serves to provide a relatively rigid support for the product so that it may be readily stacked and handled.

One form of folder which has been widely used for this purpose includes a central panel having aperture therein which is of proper size to accommodate the product projecting therethrough with the flattened ends of the pouch containing product in face contact with the rear surface of this panel. Rear wall panels are hingedly connected to opposite side edges of the intermediate panel, and are folded over into parallel relation with the intermediate panel, to clamp the marginal edges of the pouch between the intermediate panels and the rear panels. Suitable means, such as heat activatable adhesive is provided on the inner opposed surfaces of the panels to seal the packages closed.

It is the object of the present invention to provide a machine capable of withdrawing folder blanks from a hopper, and depositing the blanks on a conveyor with the intermediate panel flat against the conveyor and with the side panels or rear panels inclined upwardly and outwardly therefrom. The pouches containing the product are inserted upon the intermediate panels of the folder with the block of material projecting downwardly through the aperture therein. The side or rear panels are then folded to overlie the flattened ends of the pouch and heat is applied to the ends of the panels which project beyond the aperture to seal the package closed. The rear panels usually terminate in end abutting relation.

A further feature of the present invention resides in the provision of a machine of the type described which includes an adjustable support beneath the conveyor and against which the downwardly projecting end of the block of material may engage. The blocks of material vary in vertical length with the density of the product where a similar weight of product is to be packaged. The table beneath the conveyor may be adjusted to limit the extent to which the block of product is inserted through the folder opening so that the ends of the pouch may be properly sealed in flat condition between the folder panels.

An important feature of the present invention resides in the provision of a feeding mechanism capable of removing the folder blanks from a hopper and depositing them between pairs of lugs on the moving conveyor which fold the folders in generally channel shaped form. This feed mechanism includes a suction cup supporting head which is pivotally supported upon the end of a pair of links supported upon a drive shaft which is oscillated between two extreme positions. A pair of parallel link means are connected to the suction cup supporting head in adjustably fixed relation thereto. The ends of these links are pivotally connected to a second pair of links pivotally connected by axially aligned pivots which are parallel to the drive shaft. The last two mentioned pairs of links form toggle levers or toggle links which guide the suction head during its oscillation between two extreme positions. In one extreme position, the ends of the suction cups are substantially on the horizonal plane of the conveyor. In the other extreme position which is at an angle of somewhat more than 90° from the first position, the suction cups are positioned against a folder in an inclined hopper. During oscillation, the toggle levers pivot the suction cup supporting head in a path to remove a carton from the hopper, and to deposit it upon the conveyor between pairs of upwardly diverging lugs on the conveyor.

A further feature of the present invention resides in the provision of a pair of parallel plates or blades on opposite sides of the suction cup supporting head which extend substantially to the plane of the ends of the suction cups. These blades are designed to engage the center panel of the folder closely adjoining, and parallel to, the fold lines connecting the central panel to the rear wall panels. As the suction cups move toward the conveyor, the blades hold the central panel flat and permit the lugs on the conveyor to fold the rear wall panels upwardly until the upper edges of the rear wall panels engage hook shaped projections on the upper ends of the lugs and are held in channel shaped form thereby during a portion of the travel of the conveyor chains.

A feature of the present invention resides in the fact that the operating shaft which oscillates the suction cup supporting head is generally horizontal when the supporting head is in its lower extreme position. As a result, the head may be oscillated upwardly out of the path of the trailing rear wall of the folder, thus permitting the folders to be deposited on the conveyor while the same is in movement.

A further feature of the present invention resides in the provision of a pair of folding horns or blades, the ends of which may extend above the level of the conveyor to pass through notches in the hinged edges of the rear wall panels, and to engage opposed flanges on opposite sides of the aperture into which the product is inserted. As a result, the long narrow flanges on opposite sides of the aperture in the main panel may be folded downwardly to facilitate the insertion of the product. Means are provided for lowering these folding horns below the level of the cartons when folders with generally circular apertures are being use, as the opposed flanges in this style of the folder are sufficiently short so that they may be folded downwardly without difficulty as the product is inserted.

These and other objects and novel features of the present invention will be more clearly and fully set forth in the following specification and claims.

In the drawings forming a part of the specification:

FIGURE 1 is a side elevational view of the incoming portion of the apparatus showing the general construction thereof.

FIGURE 2 is a vertical section longitudinally through the feed mechanism of the apparatus showing the general construction thereof.

FIGURE 3 is an enlarged sectional view on a vertical plane longitudinally of the apparatus.

FIGURE 4 is a vertical sectional view transversely through the apparatus, the position of the section being indicated by the line 4—4 of FIGURE 2.

FIGURE 5 is an enlarged detail view of the mechanism which oscillates the drive shaft.

FIGURE 6 is a diagrammatic view showing the table beneath the conveyor and the manner in which the table is adjustably supported.

FIGURE 7 is a vertical sectional view showing the means for adjusting the table illustrated in FIGURE 6.

FIGURE 8 is a vertical sectional view through the table adjusting mechanism, the position of the section being indicated by the line 8—8 of FIGURE 7.

FIGURE 9 is a diagrammatic view of the blank which the apparatus is designed to fold.

FIGURE 10 is a perspective view of the completed package.

FIGURE 11 is a sectional detail through a portion of the package.

FIGURE 14 is an enlarged sectional detail of the suction controlling valve.

FIGURE 17 is a perspective detail showing diagrammatically the folding horns or blades used to fold portions of the blank illustrated in FIGURE 14.

FIGURE 18 illustrates diagrammatically the manner in which the product inserted through the folder blank is supported during the conveying operation.

Figure 12:
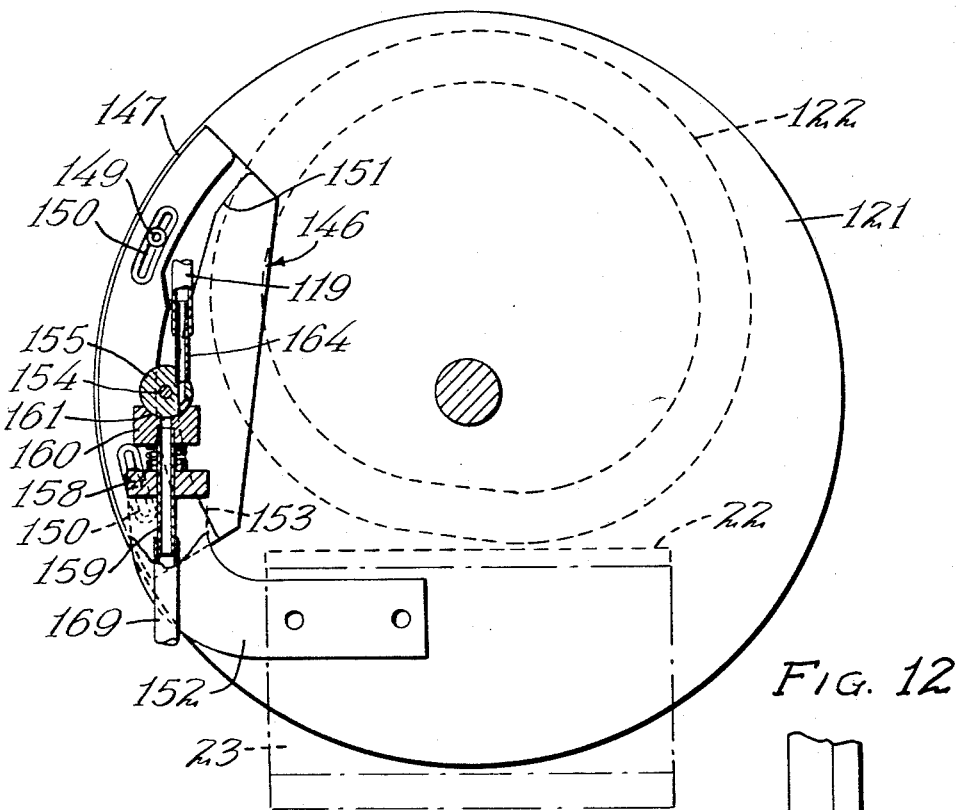
FIGURE 12 is an elevational view, partly in section, showing the drive shaft oscillating cam and the suction controlling mechanism.

The present apparatus is designed to remove a folded blank from a hopper, place the blank in proper position on a moving conveyor, and carry the partially folded blank past a filling station where the contents of the package may be applied to the folder. The partially folded folder is then completely folded by a mechanism which is not illustrated in detail in the drawings, but which folds the leading rear panel rearwardly and downwardly and folds the trailing rear panel forwardly and downwardly into substantially parallel relation to the central main panel of the folder. The package then passes through a heat sealing station which is not illustrated in the drawings, but which seals the rear panels to the pouch containing the product and to the central main panel. This sealing station is not shown in detail, as it is conventional.

The package forming apparatus is indicated in general by the letter A. The apparatus includes a generally rectangular frame having a parallel frame side 10 including upper frame side members 11, lower frame side members 12, and vertical connecting members such as 13 and 14. The vertical connecting members 13 are at the inlet end of the apparatus and form legs which may be supported by casters such as 15. The connecting members 14 are intermediate at the ends of the frame sides. Legs such as 13 are actually provided at the outlet end of the apparatus and are supported by caster wheels such as 15.

The frame side top members are connected by transversely extending connecting members, one such member 16 being at the inlet end of the frame sides, and others being provided as indicated at 17 spaced along the length of the frame sides. The legs 13 are connected by cross connecting the members 19 and 20, and the vertical connecting members 14 are connected by a transverse connected member 21. A platform 22 is supported by legs 23 or other suitable means (see FIGURE 4) and supports a gear box 24. This platform is supported by the cross member 19 extending between the vertical connecting members 13. A second gear box 25 is mounted upon the cross connecting member 21 extending between the frame upright 14. A shaft 26 is supported between the gear boxes 24 and 25 and drives the same in unison. In actual practice, the drive motor is mounted near the outlet end of the apparatus which is not illustrated. However, for the purpose of illustration, a platform 27 is shown extending between the lower frame side members 12, and supports a drive motor 29 connected through a gear box 30 to a sprocket 31 which is connected to a cooperable sprocket 32 on the shaft 26 by a suitable drive chain 33. The drive shaft is thus driven by the motor 29.

The upper frame sides 11 support bearings, one set of bearings being indicated at 34 and the other at 35. The bearings 34 and 35 support transverse parallel shafts 36 and 37, respectively. The shafts 36 and 37 support pairs of sprockets 39 and 40 which are connected by parallel conveyor chains 41. The conveyor chains act to convey the folders from the folder feeding unit which is indicated in general by the numeral 42 to a folding unit which is indicated in general by the numeral 43. In order to understand the construction, it is desirable that the construction of the folder blanks be understood.

THE PACKAGE

With reference to FIGURE 9 of the drawings, one form of folder blank is diagrammatically illustrated by the letter B. The folder includes a central or main panel 44 which is hingedly connected along parallel lines of fold 45 and 46 to the rear panels 47 and 49 respectively. It will be noted that the rear panel 47 is of lesser width than the panel 49, the purpose of this arrangement being to simplify the construction of the folding mechanism. The rearward folding of the wider panel is accomplished by a fixed folding blade which may engage the leading wider panel without interfering with the shorter trailing panel.

The folder B is provided with a central generally circular aperture 50 which extends between the fold lines 45 and 46, portions of the panel joining the fold line 45 and 46 being cut away as illustrated at 48 to prevent narrow areas of paperboard between the aperture and the lines of fold. A pair of opposed flanges 51 extend into the circular aperture from opposite sides thereof, these flanges 51 being hingedly connected to the center panel 44 along parallel fold lines 52 which are parallel to and spaced from the opposite side edges 53 and which are at right angles to the fold lines 45 and 46. In preferred form, strips 54 of heat activatable adhesive are applied along the folder edges 53, the strips 54 extending across the center panel 44 as well as the rear panels 47 and 49.

FIGURE 10 of the drawings shows the completed package. As indicated in this figure, the folder is designed to hold a generally cylindrical block of material which is indicated by the numeral 55. The block of material 55 is enclosed in a pouch normally made of polyolefin film which is generally rectangular and which is somewhat longer than the diameter of the block of material. As a result, the ends of the pouch, which are flattened and substantially on a plane with one end of the block, may be enclosed between the center panel 44 and the rear panels 47 and 49. The projecting end portions of the pouch are normally wrinkled and unattractive due to the excess of material being pressed together. The folder is designed to conceal these unsightly ends. The ends of the plastic pouch number 56 are shown in somewhat exaggerated form in FIGURE 11 of the drawings as indicated at 57.

CONVEYOR STRUCTURE

As is indicated in FIGURE 3 of the drawings, the conveyor chains 41 are equipped with a series of substantially triangular lugs 59 having upwardly and forwardly inclined rear edges 60 which are of a length slightly greater than the width of the rear panels 49. Each lug 59 is provided with rearwardly extending hook shaped upper extremity 61 which is designed to engage the marginal edge of the blank to hold the blank in position. Maintaining the blank in position is simplified by the natural tendency of the blank B to return to a flat condition.

Rearwardly of each lug 59 is a cooperable generally triangular lug 62 having an upwardly and rearwardly extending forward surface 63 which is of a length substantially equal to, or slightly greater than, the width of the rear panels 47 of the folder blanks. At the upper extremity of each lug 62 a hook shaped forwardly extending projection 64 is provided which is designed to engage the marginal edge of the blank. The hook shaped projections 61 and 64 combine to hold the blank in the channel shaped form once it is deposited between the pairs of lugs.

It will be noted that the lugs 59 are substantially higher than the lugs 62. This arrangement is provided so that a fixed folding horn may be used to fold the rear panel 60 toward a closed position.

In order to limit the depth to which the pouch 56 and its contents 55 may be inserted through the aperture 50 in the folder panel 44, a table 65 is provided beneath the level of the conveyor chains having a smooth upper surface over which the projecting end of the package product 55 may slide. As is indicated in FIGURE 8 of the drawings, the upper reaches of the chain 41 ride over elongated bars 66 which are sandwiched between a pair of spacer bars 67 of lesser height than the intermediate bar 66. The bars 66 and 67 both support side guide strips 69 which properly position the blanks as they travel the length of the conveyor, and inner plates 70 which extend upwardly to the level of the blanks being conveyed inwardly of the conveyor chains.

Due to the fact that the length of the block of material 55 may vary, the table 65 is adjustable relative to the fixed elevation of the conveyor chains. Two pairs of bearings 71 and 72 are secured in opposed relation to the inner surfaces of the upper side frame members 11 to support a pair of parallel shafts 73 and 74. As indicated in FIGURE 8 of the drawings, a sleeve 75 is keyed to the shafts, such as 74, and the sleeve is provided with a pair of spaced radially extending arms 76 projecting in parallel relation from opposite ends of the sleeve. Lugs 77 are secured to the under surface of the inverted channel shaped table 65 to extend between the arms 76. A pivot 79 extends through the arms 76 and the lug 77 to hingedly connect the table to each of the sleeves 75. As will be evident, the rotation of either shaft 73 or 74 causes the radially extending arms to pivot about the axis of the corresponding shaft, raising and lowering the table 65. The table 65 is shown in its uppermost position in FIGURE 6, and it will be understood that rotation of the shafts will ause a lowering of the table 65 from the position illustrated.

As indicated in FIGURES 7 and 8 of the drawings, a pair of vertically spaced bearings 80 are provided on one of the upper frame side members 11, not far from the shaft 74, and these bearings 80 support a vertical shaft 81 having a hand wheel 82 on its lower end by means of which the shaft may be manually rotated. The shaft 80 supports a worm gear 83 which is in mesh with a worm wheel 84 on the transverse shaft 74. Rotation of the hand wheel 82 causes rotation of the transverse shaft 74, swinging the shaft supported arms 76 about the axis of the shaft 74, raising or lowering the table 65. The shaft 73 rotates freely in its bearings 71, so that movement of the table 65 causes corresponding movement of the arms supported by the shaft 73, the arms on both shafts always remaining parallel.

FEED MECHANISM

The blank feed mechanism is best illustrated in FIGURES 1 through 5 of the drawings. A pair of side plates 85 extend upwardly from the upper edges of the upper side frame members 11, and are secured thereto. The upper edges of the plates 85 are connected by a cross connecting member 86. A pair of substantially L-shaped brackets 87 are secured to the plates 85. One arm 89 of each bracket 87 is adjustably supported to the corresponding side plates 85 by bolts 90 which extend through aligned slots 91. The other right angular arm 92 extends upwardly and rearwardly toward the outlet end of the conveyor. The arms 92 are connected to right angularly extending blank guides 93 having a vertical flange 94 to which the arms 92 are adjustably secured by bolts or similar means 95, and include right angular flanges 96 upon which the carton blanks B are supported. The blanks B are held in an inclined position, and the lowermost blank is restrained from falling from the hopper by clips or projections which prevent the blanks from leaving the hopper unless the blank is flexed to some extent. The surface of the blanks to be engaged during the withdrawal operation is on a plane which is at an acute angle to the upper reach of the conveyor chains.

The suction head 97 is provided with a pair of upwardly extending clamps 99 which secure the suction head to a transverse shaft 100. As indicated in FIGURE 2 of the drawings, the shaft 100 is supported by a pair of arms 101 which are free to rotate relative to the shaft 100 but which are secured to a parallel operating shaft 102 pivotally mounted in suitable bearings 103 on the side plates 85. The operating shaft 102 is oscillated between two extreme positions, one of which is indicated in dotted outlines, and the other in full lines in FIGURE 2 of the drawings. The means for oscillating the shaft 102 will be described in detail.

A pair of first toggle links 104 are provided at one end with sleeves 105 encircling the shaft 100 and normally held from rotation with respect thereto. The other ends of the toggle links 104 are provided with bearings 106 pivotally connected by pivots 107 to the ends 109 of second toggle links 110. The other ends 111 of the toggle links 110 are provided with bearings encircling fixed pivots 112. The fixed pivots 112 are supported by the side plates 85.

When the suction head 97 is in its lowered position illustrated in full lines in FIGURE 2, the toggle links 104 and 110 are almost in alignment as indicated. However, as the arms 101 oscillate to the position shown in dotted outline in this figure, the angularity between the toggle links 104 and 110 decreases until the toggle links 104 are at substantially right angular relation to the surface of the carton blanks B in the hopper. In other words, the suction head is swung through somewhat more than 90° by the action of the toggle levers.

The suction head 97 comprises a generally rectangular manifold block 113 which is of a length approximately equal to the distance between the side edges 53 of the blank B, and is of a width slightly less than the distance between the fold lines 45 and 46 of this blank. Two pairs of rigid tubes 114 project downwardly in parallel relation from the under surface of the block 113, the under surface 115 being the surface which is lowermost when the suction head is in the full line position shown in the drawings. The tubes 114 support suction cups 116 which terminate on a common plane. A pair of folding blades 117 are attached to opposite sides of the manifold block 113, the lower edges of the blades 117 terminating substantially on the common plane of the ends of the suction cups 116. These blades engage the inner surface of the panel 44 closely adjoining the fold lines 45 and 46, and insure the folding of the rear panels 47 and 49 along these fold lines. This is of considerable importance because the large aperture 50 in the blank weakens the blank and makes proper folding somewhat difficult to control. As seen in FIGURE 3 of the drawings, the suction cups 116 combine with the folding blades 117 to control the folding of the panels 47 and 49 as the suction head lowers the folder blank between the inclined surfaces of the lugs 59 and 62 on the conveyor chains 41. As soon as the edges of the rear panels 47 and 49 engage beneath the hook shaped projections 64 and 61 respectively, as indicated to the right of FIGURE 3, the suction head is quickly oscillated upwardly out of the path of the rear panels 47.

While not shown in detail, the manifold block 113 is provided with internal passages which provide communication between the interior of each of the tubes 114 and suction cups 116 and a flexible tube 119 which leads through a suitable valve mechanism to a source of partial vacuum. This valve mechanism will be described in detail.

As indicated in FIGURES 2, 4 and 5 of the drawings, the gear box 24 drives a transversly extending shaft 120 upon which is mounted a circular cam 121. The cam 121 is provided with an eccentric cam groove 122 in the outer face thereof. An elongated plate 123 is mounted upon the frame member 13 extending upwardly and angling somewhat rearwardly toward the outlet end of the conveyor, the plate 123 having its longitudinal center line or axis extending radially from the axis of the shaft 120. A pair of lugs 124 extend inwardly from one side edge of the plate 123 to support a fixed shaft or slide 125 which is supported parallel to the axis of the plate 123. A crosshead 126 is slidable longitudinally of the shaft 125. A flange 127 extends along the longitudinal edge of the plate 123 opposite that from which the lugs 124 project. The flange 127 includes a flange portion 129 which extends normally to the surface of the plate 123, and a right angular flange 130 which is parallel to the surface of the plate 123. The flange 127 thus forms a groove between the flange 130 and the surface of the plate 123 to accommodate a guide roller 131. The guide roller 131 is mounted upon a pivot pin 132 extending laterally from the crosshead 126. A cam roller 133 is supported upon the crosshead 126 on an axis normal to the surface of the plate 123. A rod 134 is provided at its lower end with a clevis 135 which straddles a portion of the crosshead 126 and is pivotally connected thereto as indicated at 137.

The upper end of the rod 134 is provided with an angular fitting 139 (see FIGURE 2) having a bearing 140 at its upper extremity. A pivot pin 141 pivotally connects the fitting 139 to an arm 142 having a hub 143 encircling the shaft 102 and keyed thereto. The arm 142 thus forms a crank arm for use in oscillating the shaft 102.

The cam roller 133 is positioned in the cam groove 122 of the cam 121. Rotation of the cam causes the crosshead 126 to reciprocate between two extreme positions. Reciprocation of the crosshead acts through the rod or link 134 to oscillate the arm 139, causing oscillation of the arms 101 pivotally connected to the suction head 97.

SUCTION CONTROL MECHANISM

Figure 13:
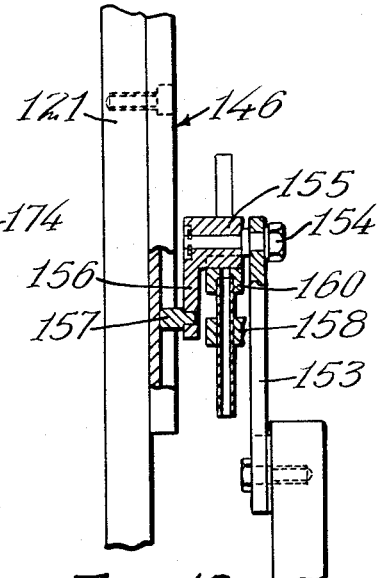
FIGURE 13 is a sectional detail through the suction controlling mechanism.

The valve controlling the suction to the suction head 97 is best illustrated in FIGURES 12 through 14 of the drawings. A plate 146 having an arcuate outer edge 147 of substantially the same radius as the cam 121 is bolted or otherwise secured to the ungrooved side of the cam 121. As indicated in FIGURE 12, the plate 146 is adjustably supported upon the cam by bolts 149 or cap screws extending through arcuate slots 150 which are coaxial with the arcuate edge 147 and spaced inwardly therefrom, the bolts being threaded into the body of the cam 121. The outer exposed surface of the plate 146 is provided with a cam track 151 which actuates the valve mechanism. An angle bracket 152 is bolted or otherwise secured to a leg 23 supporting the gear box platform 22. The projecting arm 153 of the bracket 152 extends upwardly to support a transverse pivot bolt 154 upon which is mounted a cylindrical drum 155. The drum 155 is provided with a radially extending arm 156 which supports a cam roller 157 engageable in the cam track 151.

The arm 153 is provided with a laterally projecting lug 158 which includes a vertical aperture slidably supporting a rigid tube 159. A block 160 is mounted on the upper end of the tube 159 and is provided with an arcuate recess 161 in its upper surface which snuggly fits the surface of the drum 155 to encircle about one quarter of the periphery of the drum. As indicated in FIGURE 14, the tube 159 communicates with a passage 163 leading to the surface of the groove 161. A rigid tube 164 is supported in an aperture 165 in the surface of the drum 155 and communicate with a passage 166 leading to a cavity 167 in the surface of the drum 155. When the drum 155 is in the position indicated in FIGURE 14 of the drawings, the cavity 167 is in registry with the passage 163 communicating with the tube 159. When the drum 155 is in its other extreme position, indicated in FIGURE 12 of the drawings, the cavity 167 is in communication with the atmosphere. The rigid tube 159 is connected by a flexible tube 169 to a source of partial vacuum. The rigid tube 164 is in communication with the flexible tube 119 leading to the suction head. The arrangement is such that when the valve drum 155 is in the position indicated in FIGURE 14, the suction cups 116 communicate with the source of partial vacuum. When the valve drum 155 is in the position indicated in FIGURE 12 of the drawings, the suction cups communicate with atmospheric pressure. The cam track 151 is so arranged as to draw vacuum through the suction cups from the time the suction cups are in engagement with the foremost blank in the hopper 93 until the time the blank has been deposited between a pair of lugs 59 and 62 on the conveyor chains 41.

MODIFIED PACKAGE CONSTRUCTION

Figure 15:
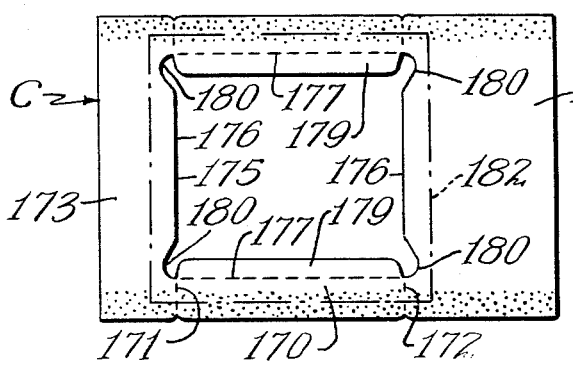
FIGURE 15 is a diagrammatic view of a modified form of blank which the apparatus is designed to seal.
Figure 16:
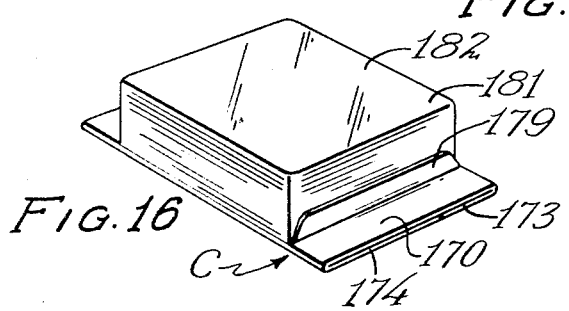
FIGURE 16 is a perspective view of the completed and sealed package formed with the blank shown in FIGURE 14.

FIGURES 15 and 16 disclose a modified form of folder C which may be used with the apparatus A. The main difference between the folder C and the folder B lies in the fact that the product is generally rectangular rather than cylindrical. The blank C includes an intermediate panel 170 which is foldably connected along opposite sides by fold lines 171 and 172 to rear panels 173 and 174 respectively. A generally rectangular aperture 175 is provided centrally in the center panel 170, two opposed edges 176 extending along the fold lines 171 and 172. The remaining right angularly extending edges of the apertures 175 are defined by fold lines 177 which connect these sides to elongated flanges 179. The corners of the aperture 175 are notched as indicated at 180, the notches 180 extending into the rear panels 173 and 174.

As indicated in FIGURE 16 of the drawings, a rectangular block of product 181 is enclosed within a pouch 182, the ends of the pouch extending beyond the block of product as in the previous construction and being folded between the front panel 170 and the rear panels 173 and 174 in the completed form of the package.

Due to the substantial length of the flanges 179, means are provided for folding these flanges downwardly prior to the insertion of the product into the folder. This means is indicated in FIGURES 3 and 17 of the drawings. As indicated in these figures, a pair of elongated folding horns 183 are pivotally supported as indicated at 184 to the side guide strips 69 or the inner plates 70. The ends 185 of the folding horns extend slightly above the level of the conveyor chains 41, and pass through the notches 180 in the rear panels 173 and 174 as is diagrammatically illustrated in FIGURE 17 of the drawings. Accordingly, the forward ends 185 of the folding horns engage above the flanges 179 and plow these flanges downwardly into angular relation to the center panel 170 of the folder C.

As is indicated, a transversely extending connecting member 186 connects the folding horns 183 beneath the level of the conveyor chains so that the folding horns will pivot in unison about the pivots 184. An operating lever 187 is pivotally connected to the cross connecting member as indicated at 189 and depends downwardly therefrom. A downwardly projecting bracket 190 is provided on the under surface of the guide plate structure have a forwardly extending plate 191 projecting therefrom parallel to the conveyors. The plate 191 supports a pin 192 projecting at right angles therefrom. The pin 192 is engageable in either of two inclined notches 193 in the edge of the arm 87. The arm is biased toward the pin 192 by a spring 194 connected between the arm 187 and an angular extension 195 of the bracket 190.

As will be seen in FIGURE 3 of the drawings, when the pin 192 is in engagement withe lower of the two notches 193, the ends 185 of the folding horns 183 project above the level of the conveyor chains 141 to fold the folder flanges 197 downwardly. When the pin 192 is engaged with the upper of the two notches, the ends 185 of the folding horns are below the level of the conveyor chains 41. The incline of the notches 193 permits the ends of the folding horns to be forced downwardly in the event the force acting upon the ends 185 of the folding horns exceeds a predetermined maximum. In other words, if the cartons jam-up on the conveyor the folding horns may be swung downwardly against the tension of the spring 194.

FIGURE 18 of the drawings shows the folder C as it is being carried along the conveyor after the pouch 182 or 55 has been inserted through the aperture of the folder. The folder illustrated could be either the folder C or the folder B. The upper surface of the table 65 is indicated by the numeral 196.

In accordance with the patent statutes, we have described the principles of construction and operation of our package forming apparatus; and while we have endeavored to set forth the best embodiment thereof, we desire to have it understood that obvious changes may made made within the following claims without departing from the spirit of our invention.

We claim:

1. A package forming apparatus for use with a folder having a main apertured panel and a pair of rear panels hingedly connected to opposite edges thereof, and a pouch of product enclosing a block of product adapted to extend through the aperture in said main panel and having marginal flanges adapted to be sandwiched between edges of said main panel and said rear panels when said rear panels are folded against the rear surface of said main panel, the apparatus including a hopper for supporting a series of flat folder blanks, a feed mechanism for removing said blanks, one by one, and a conveyor onto which said blanks are deposited by said feed mechanism, said conveyor including spaced pairs of lugs between which said blanks are deposited, said lugs flexing said rear panels out of the plane of said main panel upon insertion of said blanks therebetween, and holding said rear panels in upwardly diverging relation from said main panel.

2. The structure of claim 1 and in which said lugs include hook shaped upper extremities engageable with the edges of said rear panels.

3. The structure of claim 1 and in which said main panel includes a pair of flanges extending into said aperture and hinged thereto along fold lines which are at right angles to the lines of fold connecting said main panel to said rear panels, said rear panels having notches therein along the fold lines connecting said rear panels to said main panel and aligned with said flanges, and folding horns extending along said conveyor and extendable through said notches and above said flanges to fold the flanges downwardly.

4. The structure of claim 1 and including a vertically adjustable table beneath said conveyor and spaced from the top of the conveyor a distance substantially equal to the thickness of the block or product in said pouch.

5. A folder blank feed mechanism for use in combination with a folder hopper and a surface onto which said folder blanks are deposited, the feed mechanism including an operating shaft, arm means mounted on said shaft, means for oscillating said shaft between two extreme positions, a pivot shaft supported by the end of said arm means and parallel to said operating shaft, a suction head including suction cups engageable with said carton blanks supported by said pivot shaft, first toggle link means connected to said suction head and pivotal therewith about the axis of said pivot shaft, second toggle link means pivotally connected at one end to said first toggle link means and to a fixed pivot at the other end, and suction supply means connected to said suction head during oscillation of said pivot shaft from one extreme position to the other said toggle links acting to oscillate said suction head about pivot shaft upon oscillation of said pivot shaft about said operating shaft.

6. The structure of claim 5 and in which said toggle link means are almost in alignment when said suction head is in position depositing said blank upon said surface and the angularity between said links increases until they are at an acute angle in the other of said positions, whereby said toggle links oscillate said suction head through more than ninety degrees.

7. The structure of claim 5 and in which said suction head includes a pair of spaced folding blades which terminate substantially on the plane of the ends of the suction cups.

8. The structure of claim 7 and in which said suction cups are between said folding blades.

9. The structure of claim 5 and in which said surface onto which said blanks are deposited comprises a conveyor or surface.

References Cited

UNITED STATES PATENTS

| 2,651,898 | 9/1953 | Kimball | 53—186 |
| 2,999,344 | 9/1961 | Clanin et al. | 53—186 |
| 3,352,216 | 11/1967 | Wainberg | 93—51 |
| 3,354,610 | 11/1967 | Stelzer | 93—49 XR |

BERNARD STICKNEY, *Primary Examiner.*